US012738123B2

(12) United States Patent
Barbour et al.

(10) Patent No.: US 12,738,123 B2
(45) Date of Patent: Sep. 15, 2026

(54) LARGE LED DISPLAY FOR MULTIPLE GAMING FORMAT

(71) Applicant: Aristocrat Technologies, Inc., Las Vegas, NV (US)

(72) Inventors: Timothy Barbour, Nolensville, TN (US); Rajendrasinh Jadeja, Las Vegas, NV (US); Frank Rodriguez, Las Vegas, NV (US); Xiaoqiang Gong, Henderson, NV (US); Stephen Shaffer, Jr., Las Vegas, NV (US); Paul Barker, Chicago, IL (US); Joseph Masinter, II, Las Vegas, NV (US); Alfred Thomas, Ventura, CA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 397 days.

(21) Appl. No.: 18/301,103

(22) Filed: Apr. 14, 2023

(65) Prior Publication Data

US 2023/0334934 A1 Oct. 19, 2023

Related U.S. Application Data

(60) Provisional application No. 63/332,200, filed on Apr. 18, 2022.

(51) Int. Cl.
*G07F 17/32* (2006.01)

(52) U.S. Cl.
CPC ...... *G07F 17/3211* (2013.01); *G07F 17/3209* (2013.01); *G07F 17/3213* (2013.01)

(58) Field of Classification Search
CPC ............. G07F 17/3211; G07F 17/3209; G07F 17/3213
See application file for complete search history.

(56) References Cited

U.S. PATENT DOCUMENTS

| | | | | |
|---|---|---|---|---|
| 2007/0054723 | A1* | 3/2007 | Mattice | G07F 17/32 463/16 |
| 2009/0011815 | A1* | 1/2009 | Stergides | G07F 17/3244 463/20 |
| 2019/0295362 | A1* | 9/2019 | Pececnik | G07F 17/3213 |
| 2020/0090459 | A1* | 3/2020 | Winston | G09F 9/37 |
| 2021/0065501 | A1* | 3/2021 | Bernard | G07F 17/3216 |
| 2022/0103738 | A1* | 3/2022 | Deighton | H04N 23/74 |

* cited by examiner

*Primary Examiner* — Werner G Garner
(74) *Attorney, Agent, or Firm* — Blank Rome LLP

(57) ABSTRACT

An Electronic Gaming Machine (EGM) with a large annular display region for enhanced gameplay in a single or multiple cabinet system is disclosed. In the center of the annular display region is an independent, central display region. One or more pointers with display capabilities are configured to indicate a portion of the annular display region during gameplay. The EGM may be used for cabinet play and/or dealer-controlled play. The EGM may also include one or more input devices, for example a touch sensor, for dealer and/or player interaction.

12 Claims, 9 Drawing Sheets

LARGE LED DISPLAY FOR MULTIPLE GAMING FORMAT

CROSS REFERENCE TO RELATED APPLICATIONS

This patent application claims the benefit of U.S. Provisional Patent Application No. 63/332,200, filed Apr. 18, 2022, the disclosure of which is hereby incorporated by reference.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

EGMs use interacting light effects, sounds, and displays to attract players and to enhance gameplay. Typical gaming environments may now include connectivity between devices for gameplay, as well as for security and monitoring the system. As a result, EGMs have evolved into sophisticated, technologically advanced devices.

SUMMARY

In one aspect, embodiments are directed to a system that includes a wheel system with a wheel portion that includes a central display area and an annular display area surrounding the central display area. The annular display area is sectioned into sub-regions each configured to present one or more symbols. The wheel system also includes a base structure configured to hold the wheel portion. The base structure may include an audio system. The system further includes a game controller configured to execute computer code to cause presentation of game graphics on the wheel portion.

In another aspect, embodiments are directed to a gaming device. The gaming device includes a wheel system with a wheel portion that includes a central display area and an annular display area surrounding the central display area. The annular display area is sectioned into sub-regions each configured to present one or more symbols. The wheel system also includes a base structure configured to hold the wheel portion. The base structure may include an audio system.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Figure 1:
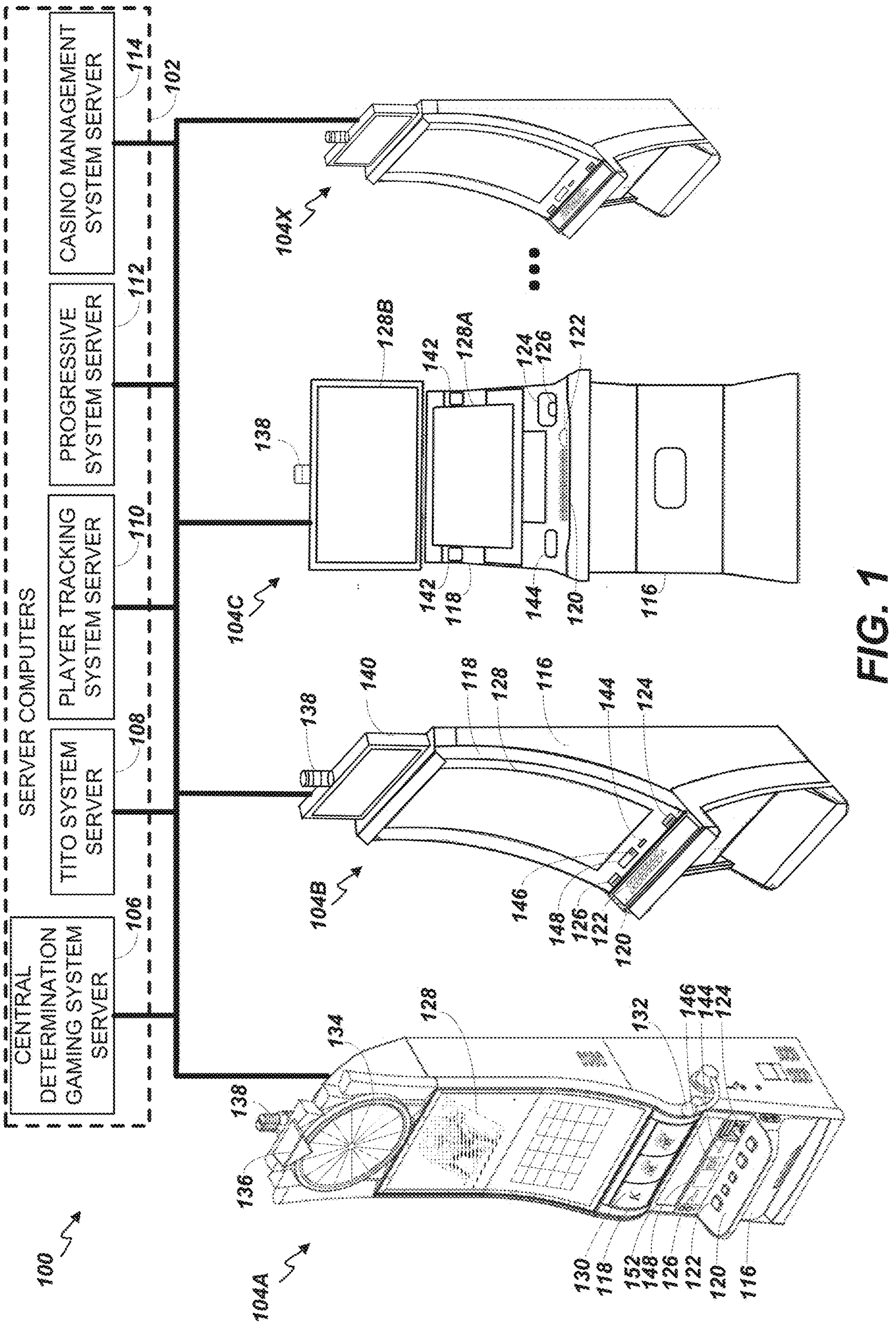
FIG. 1 is an exemplary diagram showing several EGMs networked with various gaming related servers in accordance with one or more embodiments disclosed herein.

In general, embodiments disclosed herein are directed to an EGM with a large annular display region for enhanced gameplay in a single or multiple cabinet system. In the center of the annular display region is an independent, central display region. Embodiments may include one or more pointers with display capabilities designed to indicate a portion of the annular display region. Embodiments may be used for cabinet play and/or dealer-controlled play. Embodiments may also include one or more input devices, for example a touch sensor, for dealer and/or player interaction.

Embodiments may be used for multiple gaming formats in different configurations. More specifically, embodiments include a wheel system that may be part of a stand alone EGM, or the wheel system may be a separate component that is shared among game machines or other connected devices. The wheel system may be designed for up to 360-degree viewing. In some embodiments, a controller that drives the display of the wheel may be communicably connected to one or more devices, such as game cabinets, mobile devices, and the like, which may have additional user input components that may be used in game play.

In some embodiments, the annulus-shaped display region may be configured to present portions in a manner such that the portions move in a clockwise or counterclockwise motion around the annulus-shaped display region. As such, the annulus-shaped display region may be used to mimic the view of a spinning wheel. The speed at which the portions move along the display region may be software-driven, and/or may be based on user input in accordance with embodiments disclosed herein.

The various portions of the annular display region may be driven by animation provided by a game running on a gaming system. The various portions of the annular display may collective define the theme of the game. Specifically, each portion of the annular display may display animation directed to one part of an overall theme or contest, such as teams in an organization or contest. In some embodiments, such a contest may be part of the game play.

Embodiments may include an internal bezel is imposed between the central display region and the annular display region. Embodiment may also include an external bezel may surround the exterior of the annular display region. In some embodiments, a lit edge may surround the outer surface of the annular display region. In some embodiments, the wheel system sits atop a base component, which may include an audio system.

In some embodiments, the wheel may include a central LED display region surrounded by a mechanical annulus-shaped region configured to mechanically spin around the central LED display region. In some embodiments, the annulus-shaped region may include pin components protruding from the face of the annulus-shaped region. Such pins may be configured to be grasped and pulled by a user to initiate a spin of the annulus-shaped region. In some embodiments, an outcome of a spin may be determined based on a symbol on a portion of the annulus shaped region corresponding to a placement of a pointer, such as an LED pointer or other pointer on the wheel. Alternatively, a ball or other object may be encased in front of the wheel such that when the wheel is spun, the ball bounces between regions of the annulus-shaped regions as they spin, and the outcome of the spin is determined based on a placement of the ball at the conclusion of the spin. In some embodiments, the ball may be a spherical ball, or may have a spheroid shape such as a football, or other regular or irregular three dimensional shape.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. In some systems, a single gaming device may include one or more cabinets. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone) (not shown), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
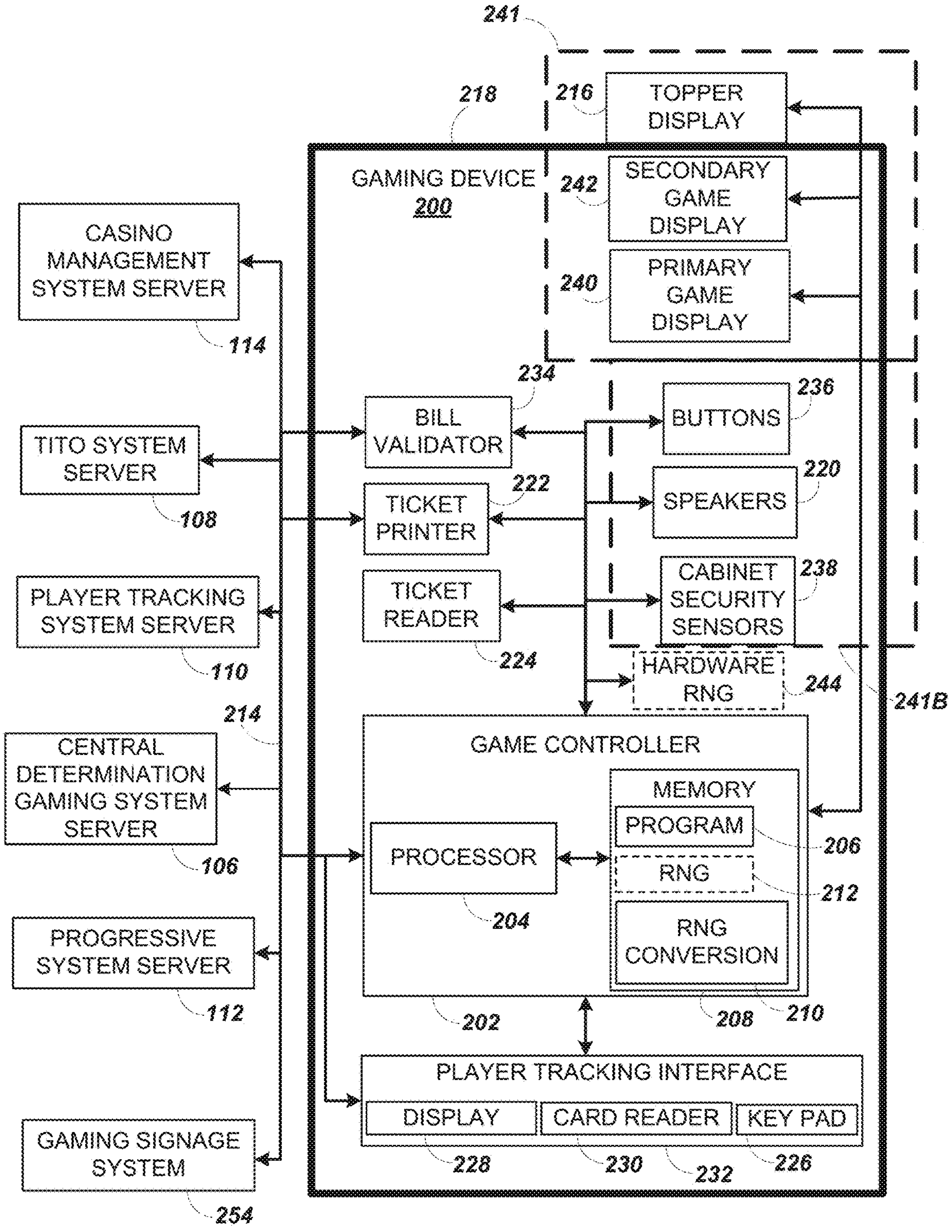
FIG. 2A is a block diagram showing various elements of an exemplary EGM in accordance with one or more embodiments disclosed herein.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc' model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Each gaming device may include one or more cabinets forming the single networked gaming device. For example, a gaming device may include a separate component, such as a wheel system that is shared among game consoles or other connected devices. In such embodiments, the separate component may or may not be directly connected to the network.

FIG. 2A is a block diagram depicting exemplary electronic components of a gaming device 200 connected to various external systems. All or parts of the gaming device 200 shown could be used to implement any one of the example gaming devices 104A-X depicted in FIG. 1 and described herein. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200. A portion of the components 241 may be included in a separate cabinet from the cabinet 218 in accordance with embodiments disclosed herein. In such embodiments, other components 241B may also be included or duplicated in the separate cabinet. Such components include speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202. Although FIG. 2A illustrates that the gaming device 200 includes three displays (primary 240, secondary 242, topper 216), embodiments may include any number of displays. In embodiments with some components 241 in a separate cabinet, the signal for the one or more displays may be transmitted to the separate cabinet in a single video signal connection.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on one or more displays of the gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the displays. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on one or more displays. Alternatively, such display controllers may be integrated into the game controller 202. The use and discussion of FIGS. 1 and 2 are examples to facilitate ease of description and explanation.

Figure 2B:
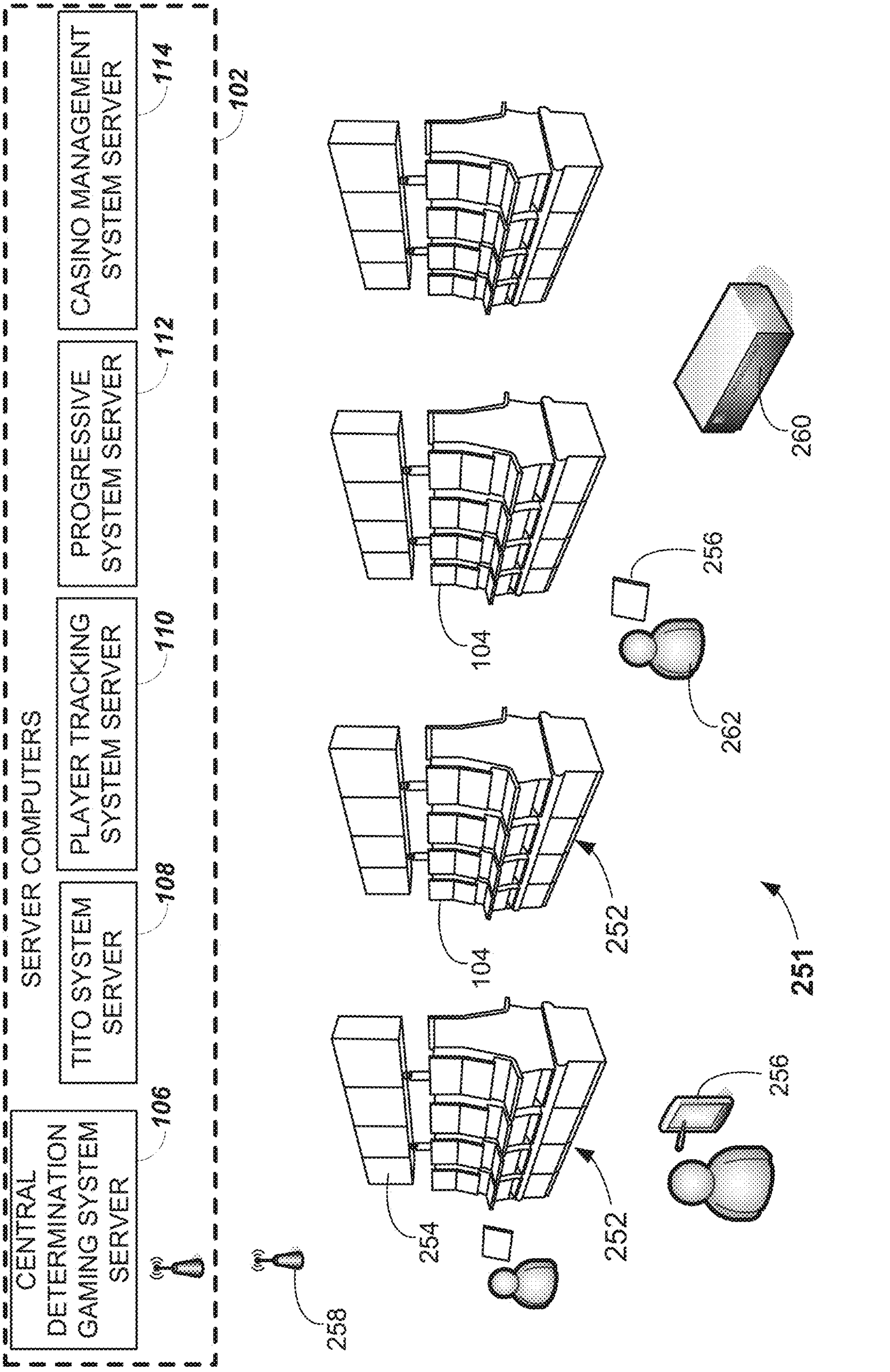
FIG. 2B depicts a casino gaming environment according to some aspects of the present disclosure.

FIG. 2B depicts a casino gaming environment according to some aspects disclosed herein. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

Embodiments disclosed herein may be considered a bank 252 or an individual EGM 104 in the context of FIG. 2B. Embodiments disclosed herein may include a wheel system corresponding to the gaming signage system 254 of FIG. 2B.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
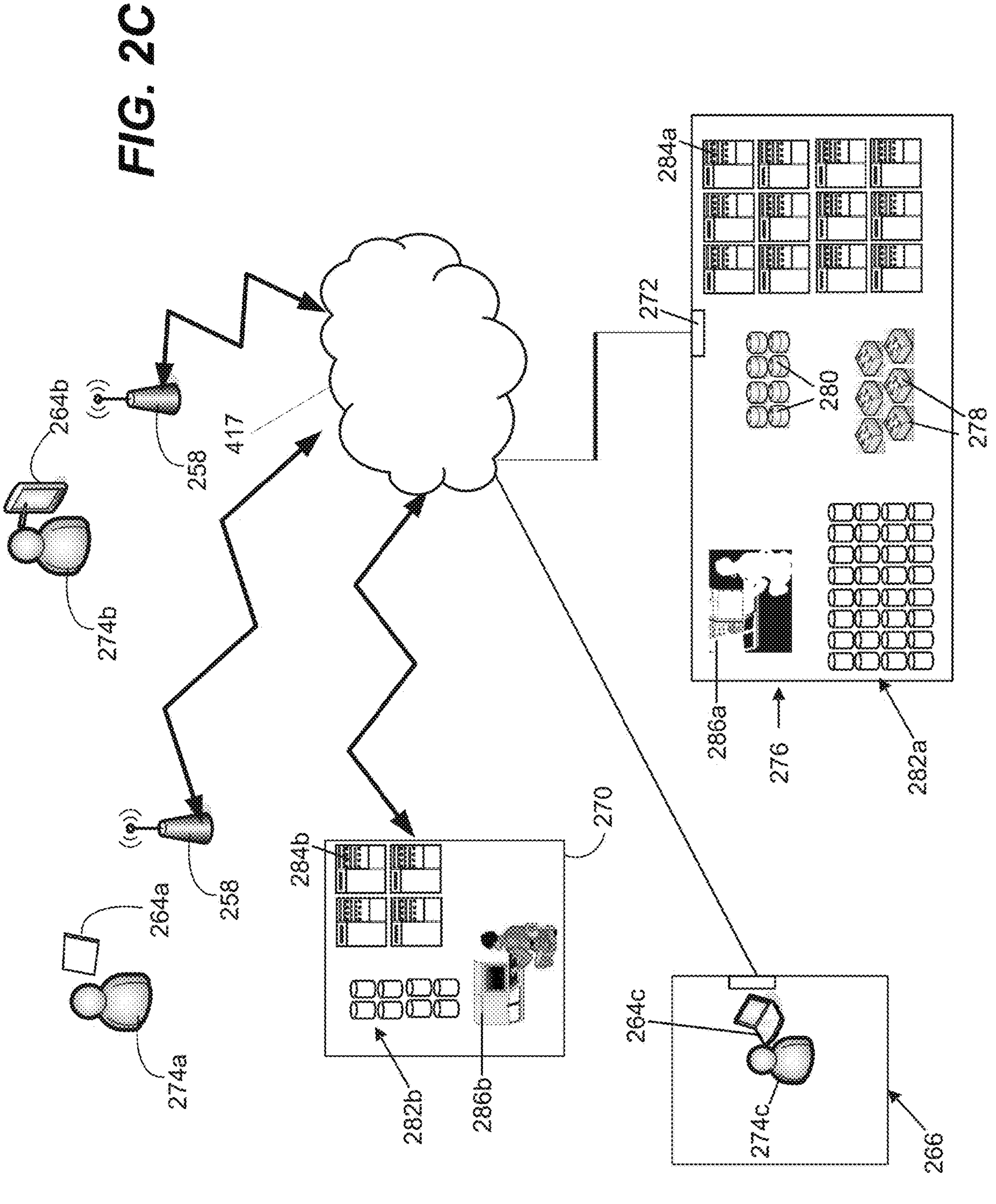
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
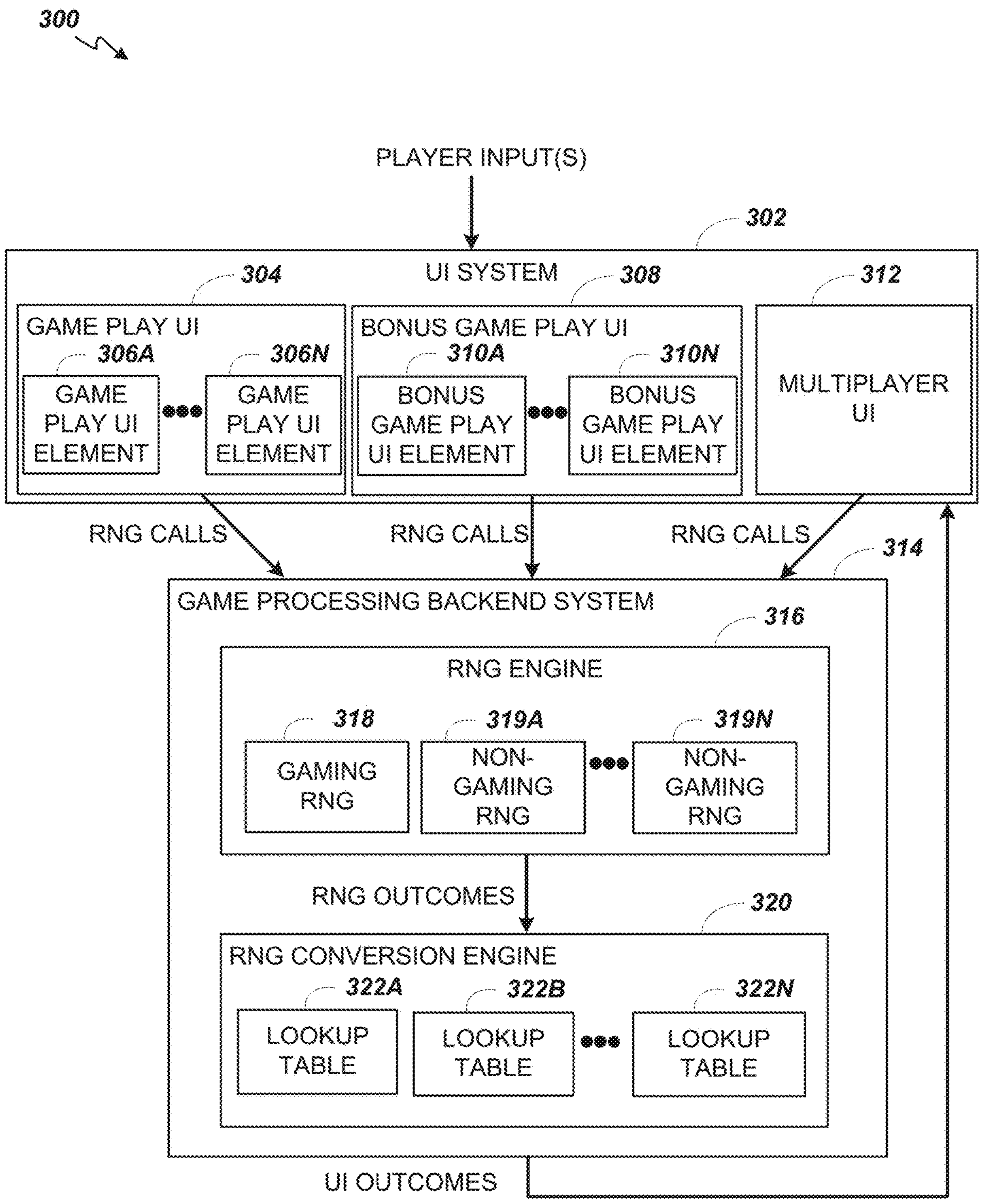
FIG. 3 illustrates an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
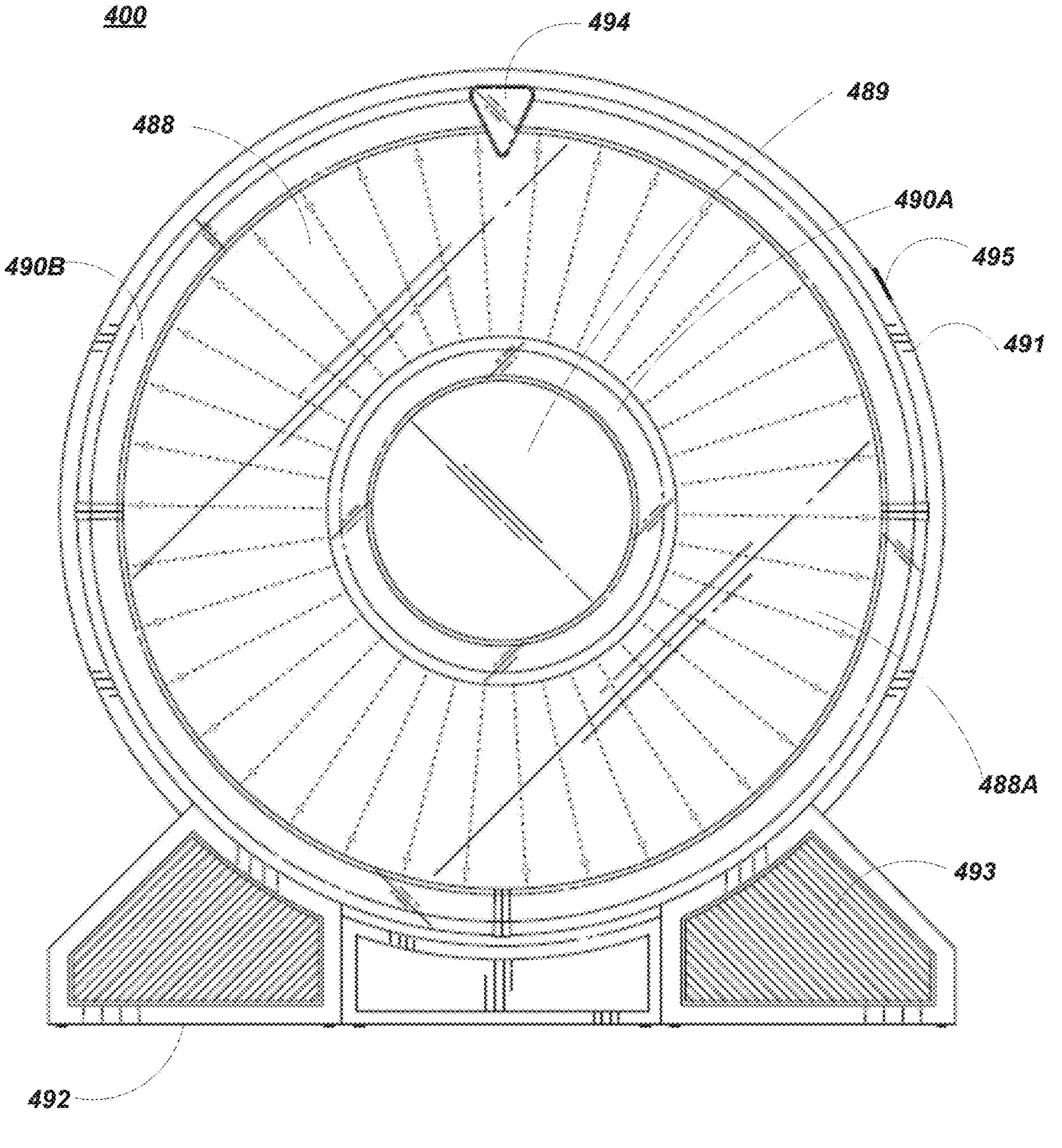
FIG. 4 is a diagram that shows an example of a gaming device according to some aspects of the disclosure.

FIG. 4 demonstrates a wheel system in accordance with one or more embodiments disclosed herein. The wheel system may be part of an EGM or part of a bank of EGMs in accordance with embodiments disclosed herein. In the example of FIG. 4, the wheel system 400 is a separate cabinet that may be used in conjunction with one or more consoles or mobile game devices.

The wheel system 400 includes an annular display area 488 onto which image data is presented. The wheel system 400 also includes a central display area 489 for displaying image data. The wheel system may also include one or more bezels 490A-490B, an edge 491, a base 492, speakers 493, a pointer 494, and an input device 495. Each of these components is described below.

The annular display area 488 may include one or more LED panels. The annulus-shaped region may be divided into a set of sub-regions onto which a particular symbol or set of symbols may be displayed. In some embodiments, each of the sub-regions of the annulus-shaped region may be comprised of an individual LED panel. For example, as shown in FIG. 4, each LED panel 488A may be in the shape of a wedge or a portion of a wedge. In some embodiments, the annular display area 488 may be separated based on a presentation style. For example, each portion may be configured to present a symbol used in the gameplay.

The annular display area 488 may vary in shape and size. Accordingly, a combination of LED squares and triangles, small pie shaped wedges, and large pie shaped wedges may be used to establish the annular display area 488. In some embodiments, the panels 488A may be configured to be assembled in four quarter sections so that the wheel system 400 may easily be built, replaced, and serviced as needed. In some embodiments, square panels may be used to increase or decrease a radius of the annular display area. That is, the size of the annular display area 488 may be increased or reduced by adding or removing additional of panels along the circumference of the annular display area 488; thus, increasing or decreasing the radius of the annular display area 488. One or more bezels may be utilized when increasing the radius of the annular display area 488 in accordance with embodiments disclosed herein. In some embodiments, the four quarter sections may be used, with the addition of square panels to increase the wheel system to the desired size. For example, a wheel system in accordance with embodiments may be greater than 6 feet tall. The example of FIG. 4 demonstrates a wheel system 400 that is −9.5 feet tall.

The wheel system 400 includes a central display area 489. The central display area may be an LCD. The central display area 489 may include a small projector with rear projection film, a square LCD, round LCD, a plasma cut OLED display, or a laser phosphor display in accordance with embodiments disclosed herein.

In some embodiments, during gameplay, the annular display area 488 may be used to present symbols in a manner such that the symbols move in a clockwise or counterclockwise motion around the annulus-shaped display region. As such, the annulus-shaped display region may be used to mimic the view of a spinning wheel. The speed at which the symbols move along the display region may be software-driven, and/or may be based on user input.

According to some embodiments, an internal bezel 490A is disposed between the central display area 489 and the annular display area 488. Similarly, in some embodiments, an external bezel 490B may surround a circumference of the wheel system. The bezels 490A-490B may be a formed bezel that may, or may not, include additional lighting incorporated therein. The bezels 490A-490B may be vacuum formed or molded. Such bezels may be illuminated by lighting, e.g., display panels disposed underneath, to show custom graphics circling on the wheel. The bezels 490A-490B may be separately addressable lights in accordance with embodiments disclosed herein.

As noted, the bezels 490A-490B may incorporate additional built-in lighting, or may overlay one or more LED panels. In some embodiments, the panels 488A that comprise the annular display area 488 may extend under one or more of the bezels 490A-490B. In embodiments, the underlying panels of the bezels 490A-490B may be used to project gameplay features such as one or more pointers, one or more balls or other objects, and the like that help determine an outcome. Additionally, or alternatively, underlying LED panels may be used to project game-related visuals or animations. The external bezel 490B that encases the annular display area 488 may be configured for easy removal/replacement.

As noted above, the annular display area 488 may be constructed in segments, such a quadrants. The exterior bezel 490B may also be constructed in segments, in coordination with the annular display area 488. According to one or more embodiments, the central display region 489 may be a single component and the interior bezel 490A may be a single component, while the annular display area 488 and the exterior bezel 490B may be constructed in segments, such a quadrants. In such embodiments, each segment of the annulus-shaped display region 488 and the external bezel 490B may be mounted to the central display area 489.

In some embodiments, an edge 491 may surround the outer surface of the wheel system 400. The edge 491 may include, for example, an edge-lit acrylic. In some embodiments, the edge 491 may be configured to hold lighting or include other lighting features. The annular display area 488 may be surrounded by an edge 491 that is an illuminated, or not illuminated, piece of acrylic that comprises a soft glow. The edge 491 may serve as a mount for an input 495. For example, the input may be a touch interface allowing a dealer to slide their hand along the edge 491 for activation of a spinning wheel.

The annular display area 488 is disposed atop a base 492. In some embodiments, the base 488 may include an audio system with one or more speakers 493. The audio system may be a mono system, stereo system, binaural audio system, other immersive audio system, or the like. In some embodiments, the audio system may be configured to provide 3D sound.

As noted, the speakers 493 may establish multiple form factors for sound, such as binaural audio for immersive sound technology, multiple channel audio for surround sound. The speakers 493 may be disposed in the base 492 or on the sides of the wheel system 400. Additional lights may point at the speaker cones for sound effects.

The base 492 may include a three segmented design allowing for the expansion (and decrease) of the diameter of the annular display area 488 for different size systems. In some embodiments, the base 492 may include one or more levelling mechanisms on a bottom surface. The levelling mechanism or mechanisms (not shown) may be configured to be manipulated to allow the wheel system 400 to sit flat and/or stable on an uneven floor.

The wheel may include one or more pointers 494. The pointer 494 may be a triangular LED panel or LCD. In some embodiments, the one or more pointers may be part of the annular display area 488, the central display area 489, and/or the bezels 490A-490B. The pointer 494 may be configured to present a software-determined image or lighting based on a game being conducted on the system. In embodiments utilizing a triangular LED panel as a pointer 494, the triangular panel may be configured to physically move. For example, the triangular panel may utilize a small motor to cause the pointer 494 to make small rotations giving the appearance that the symbols presented in the annular display area 488 are causing the pointer 494 to move.

According to one or more embodiments, the video feed for the central display area 489, the annular display area 488, and/or the bezels 490A-490B lighting may be provided from a single video port on the wheel system 400. The various portions of the one or more LED panels that comprise the annular display area 488 may be driven by animation provided by a game running on a gaming system. In some embodiments, the central display area 489, the annular display area 488, and/or the bezels 490A-490B lighting may be graphically mapped to accommodate the use of a single video port in the wheel system 400. That is, a single video signal may be used for all the central display area 489, the annular display area 488, bezels 490A-490B, pointer 494, etc.

According to some embodiments, the wheel system 400 may include one or more inputs 495. For example, the input may be a button, dial, roller, or touch panel. The input 495 may be disposed an outer edge of the wheel, or on the back of the wheel. In some embodiments, a software controlling a game instance on the wheel may utilize touch input to determine how the graphics are presented on the wheel. For example, the velocity, acceleration, and direction the wheel-like spinning motion of the symbols moving around the annular display area 488 could correspond to the user input received through the touch sensor.

In some embodiments, the input 495 may be a mechanical and/or electromechanical input. For example, a plunger, a pull handle, or other mechanical input device maybe connected to the wheel system 400 such that input via the mechanical input device initiates a wheel spin. The input 495 may be directly connected to the wheel system 400, or may be part of a separate system communicably coupled to the wheel system, such as an external cabinet or the like.

Additionally, or alternatively, the input 495 may be communicably connected to one or more additional devices, such as game cabinets, mobile devices, and the like. In such embodiments, the additional device has additional user input components which may be used in gameplay. For example, the touch sensor on a mobile device and/or a game cabinet may be used to trigger spinning of the symbols displayed on the annular display are 488. The characteristics of the touch-based input may also affect the wheel spin, such as speed, velocity, direction, and the like in accordance with embodiments disclosed herein.

According to some embodiments, the wheel system 400 may include a central display area 489 surrounded by a mechanical annulus-shaped region that includes the annular display area 488. The mechanical annulus-shaped region is configured to mechanically spin around the central display are 489. The annulus-shaped region may be mounted on a circular hub that uses tracks and rollers to physically spin around the center display area 489. The wheel can also be driven via brushless DC motor or stepper motor to control the desired outcome.

In some embodiments, the annulus-shaped region may include pin components (not shown) protruding from the face of the annular display area 488. Such pins may be configured to be grasped and pulled by a user to initiate a spin of the annulus-shaped region. In some embodiments, an outcome of a spin may be determined based on a symbol on a portion of the annular display area 488 corresponding to a placement of a pointer 494 or other pointer on the wheel. The movement of the annulus shaped region may be motor-assisted according to some embodiments.

In some embodiments, a ball or other object may be encased in the wheel system 400 such that when the wheel is spun, the ball bounces between regions of the annular display area 488 as the wheel is spun. The outcome of the spin may be determined based on a placement of the ball at the conclusion of the spin. In such embodiments, the ball may be a spherical ball, or may have a spheroid shape such as a football, or other regular or irregular three dimensional shape.

In accordance with embodiments disclosed herein, the wheel system 400 may be single sided or double sided with the same display components to allow viewing from the back. In other embodiments, three of the wheel systems 400 shown in FIG. 4 may be arranged into a triangular bank to allow 360-degree viewing. In such embodiments, a single video connection may be used for controlling the display on the three wheel systems.

Figure 5:
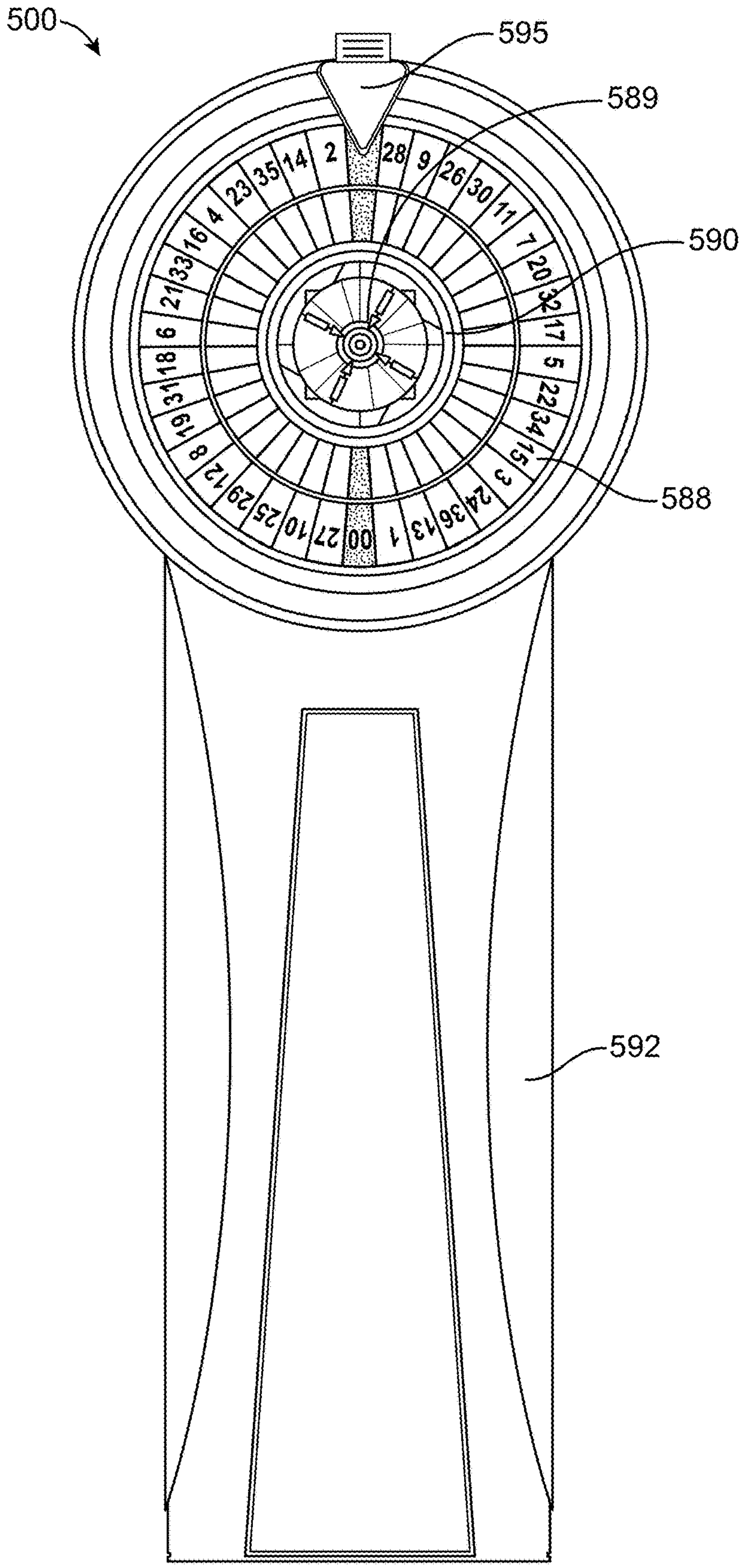
FIG. 5 depicts a second example of a gaming device in accordance with one or more embodiments disclosed herein.

Another example of a wheel system is shown in FIG. 5 in accordance with embodiments disclosed herein. The wheel system 500 includes the annular display area 588, the central display area 589, an inner bezel 590, a base 592, and a pointer 594, as well as other components demonstrated in FIG. 4.

The example shown in FIG. 5 demonstrates a wheel system 500 that may operate similar to a traditional roulette game; however, one of ordinary skill in the are will appreciate that embodiments are not limited as such. Other symbols may be used for the sub-regions in the annular display area instead of numbers. For example, the annular display area sub-regions may represent different teams in sports organizations. The annular display area sub-regions may represent other entities without departing from the scope of embodiments disclosed herein, such as different characters (real or fictional), countries, etc.

Figure 6:
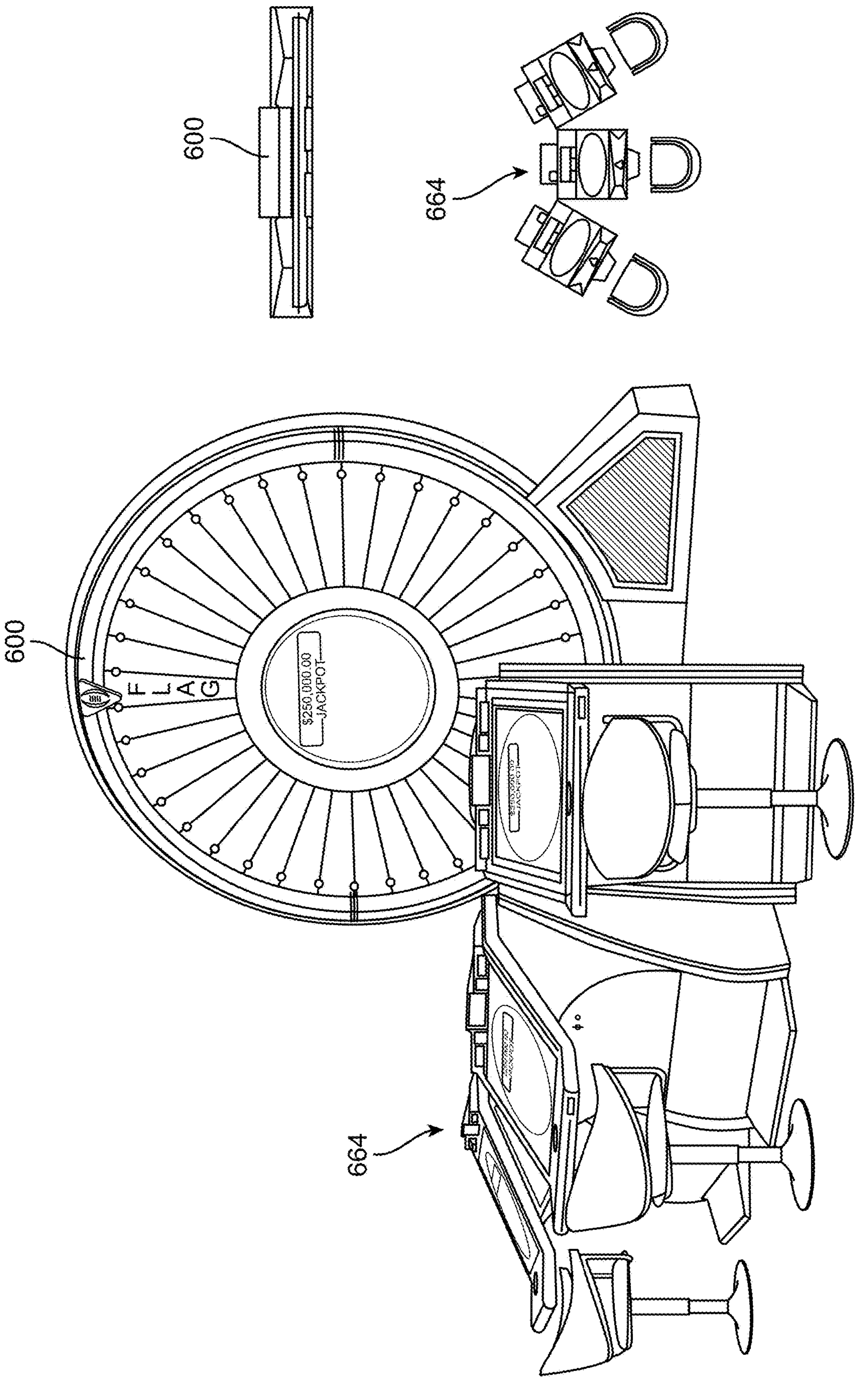
FIG. 6 depicts an example of a gaming system in accordance with one or more embodiments disclosed herein.

Embodiments of the wheel system may be connected to one or more consoles or gaming devices. For example, a wheel system may be connected to a bank of machines. FIG. 6 demonstrates a wheel system 600 with a bank of three consoles 664. The consoles 664 may be linked such that the wheel system 600 may support single or multi-player gameplay. As described above with respect to FIGS. 1-3, the wheel system 600 and consoles 664 may constitute one EGM in the overall system. The wheel system 600 may also function supplementally to one or more consoles 664 or mobile game devices, analogous to the gaming signage system 254 of FIG. 2.

Figure 7:
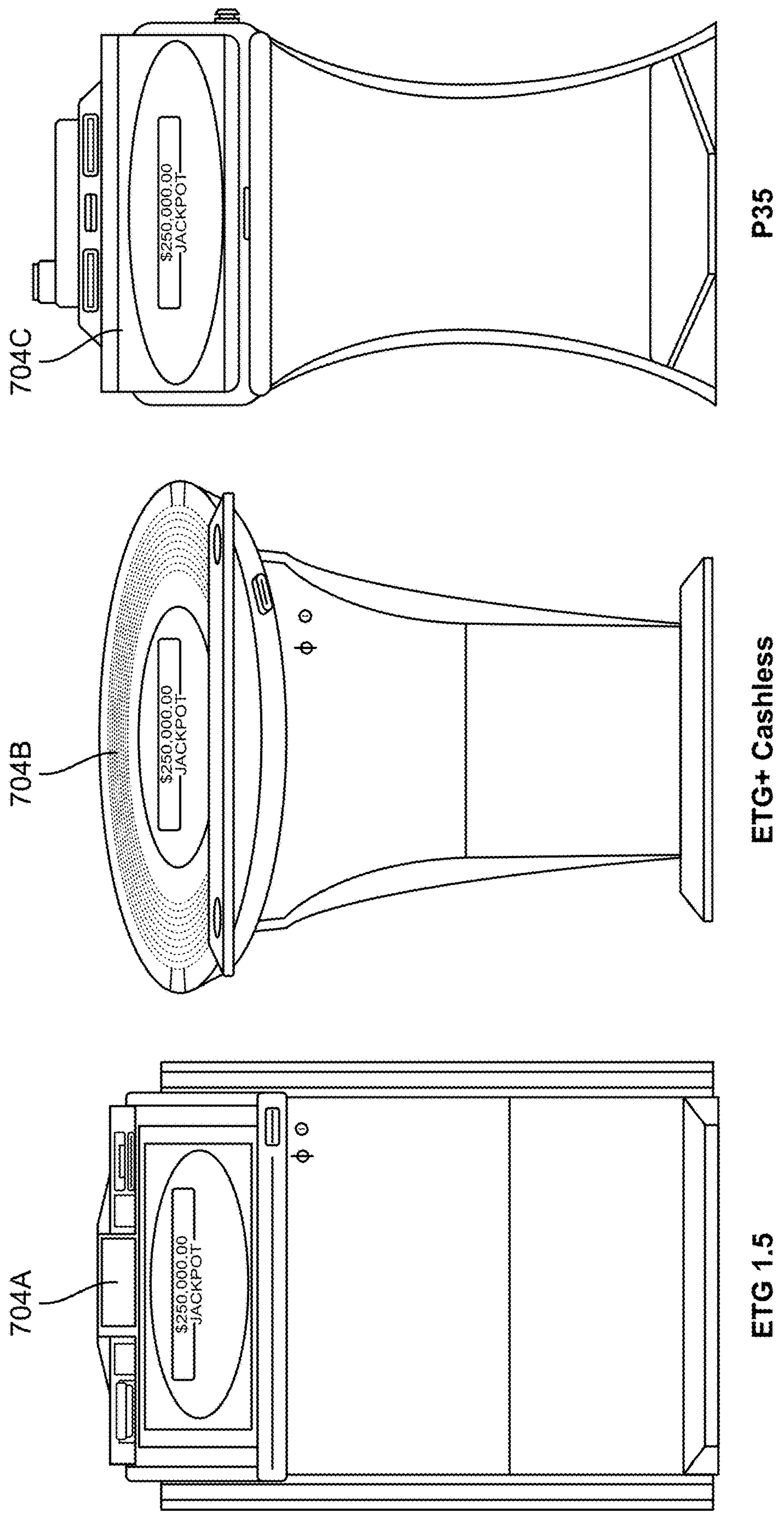
FIG. 7 depicts examples of other gaming devices in accordance with one or more embodiments disclosed herein.

FIG. 7 demonstrates different configurations of consoles in accordance with embodiments disclosed herein. The consoles 704A-704C may be used in conjunction with the wheel systems disclosed herein. The consoles may include some or all the components described in FIG. 2A. In some embodiments, the consoles may be configured to provide gameplay separate from a wheel system. That is, the consoles may not require a wheel system for all gameplay and may further function as a separate EGM. As can be seen in FIG. 7, the footprint of the consoles, and hence embodiments disclosed herein, may vary to accommodate to number of consoles and the area of deployment.

Embodiments provide a large format round display, with an integrated display in the center, and LED pointer for enhanced game play in multiple cabinet formats. Embodiments may be used for cabinet play or may include dealer controlled play via an input. Embodiments may provide cutting edge immersive sound, lighting, and high definition imagery for players that is well suited for multiple gaming formats. Embodiments may be dual sided, or provide 360 degrees of view, for play with an unlimited number of consoles attached. Embodiments may provide multiple different game titles that may be configured through software updates.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:

a wheel display system, the wheel display system comprising:

a wheel portion comprising:

a central display area;

an annular display area surrounding the central display area, wherein the annular display area comprises a plurality of LED panels and is sectioned into sub-regions each configured to present one or more symbols; and at least one pointer configured to indicate a sub-region of the annular display area, wherein the at least one pointer is configured to be mechanically moved by a motor, and wherein the motor causes the pointer to make rotations giving the appearance that symbols presented in the annular display area are causing the pointer to move; and a base structure configured to hold the wheel portion, wherein the base structure comprises an audio system; and a game controller configured to execute computer code to cause presentation of game graphics on the wheel portion, wherein a video signal is provided in a single video port of the wheel system.

2. The system of claim 1, the wheel portion further comprising:

an input device configured to receive an input, wherein graphics are presented on the annular display area in accordance with the input device.

3. The system of claim 2, wherein the input device is a touch sensor.

4. The system of claim 1, the wheel portion further comprising:

one or more circular bezels surrounding at least one of the central display area and the annular display area.

5. The system of claim 1, wherein each panel corresponds to a sub-region of the annular display area.

6. The system of claim 1, wherein the game controller is disposed in a console, separate from the wheel system.

7. A gaming device comprising:

a wheel display system, the wheel display system comprising:

a wheel portion comprising:

a central display area;

an annular display area surrounding the central display area, wherein the annular display area comprises a plurality of LED panels and is sectioned into sub-regions each configured to present one or more symbols; and at least one pointer configured to indicate a sub-region of the annular display area, wherein the at least one pointer is configured to be mechanically moved by a motor, and wherein the motor causes the pointer to make rotations giving the appearance that symbols presented in the annular display area are causing the pointer to move; and a base structure configured to hold the wheel portion, wherein the base structure comprises an audio system; and a single video port, wherein a video signal is provided in the single video port of the wheel system.

8. The device of claim 7, the wheel portion further comprising:

an input device configured to receive an input, wherein graphics are presented on the annular display area in accordance with the input device.

9. The device of claim 8, wherein the input device is a touch sensor.

10. The device of claim 7, the wheel portion further comprising:

one or more circular bezels surrounding at least one of the central display area and the annular display area.

11. The device of claim 7, wherein each panel corresponds to a sub-region of the annular display area.

12. The device of claim 7, further comprising a game controller configured to execute computer code to cause presentation of game graphics on the wheel portion.

* * * * *